(12) United States Patent
Lach et al.

(10) Patent No.: US 6,969,218 B2
(45) Date of Patent: Nov. 29, 2005

(54) PROFILE TURNING TOOL

(75) Inventors: Horst Lach, Hanau (DE); Eugen Maurer, Ober-Mörlen (DE)

(73) Assignee: Jakob Lach GmbH & Co. KG, (DE)

( * ) Notice: Subject to any disclaimer, the term of this patent is extended or adjusted under 35 U.S.C. 154(b) by 0 days.

(21) Appl. No.: 10/472,210

(22) PCT Filed: Mar. 12, 2002

(86) PCT No.: PCT/EP02/02670

§ 371 (c)(1),
(2), (4) Date: Jan. 20, 2004

(87) PCT Pub. No.: WO02/076660

PCT Pub. Date: Oct. 3, 2002

(65) Prior Publication Data

US 2004/0120778 A1    Jun. 24, 2004

(30) Foreign Application Priority Data

Mar. 21, 2001   (DE) ................................ 101 13 633

(51) Int. Cl.⁷ .................... B23P 15/28; B26D 1/00; B26D 3/00
(52) U.S. Cl. ................ 407/5; 407/107; 407/2; 407/101; 407/100; 407/106; 407/115; 407/119
(58) Field of Search .................. 407/2, 5, 101, 407/100, 106, 107, 111, 115, 119

(56) References Cited

U.S. PATENT DOCUMENTS

| | | | | |
|---|---|---|---|---|
| 811,786 A | * | 2/1906 | Miller | 82/161 |
| 936,793 A | * | 10/1909 | Middleton | 407/111 |
| 1,397,358 A | * | 11/1921 | Bronander | 407/107 |
| 2,799,079 A | * | 7/1957 | Brigner, Jr. | 407/3 |
| 3,205,557 A | * | 9/1965 | Frommelt et al. | 407/109 |
| 3,325,877 A | * | 6/1967 | Jonsson | 407/6 |
| 3,500,522 A | * | 3/1970 | Stier | 407/106 |
| 3,534,457 A | * | 10/1970 | Mueller | 407/101 |
| 3,646,649 A | * | 3/1972 | Oaks et al. | 407/87 |
| 3,693,224 A | * | 9/1972 | Bartoszevicz | 407/111 |
| 3,939,539 A | * | 2/1976 | Novak | 407/107 |
| 3,959,861 A | * | 6/1976 | Mihic | 407/107 |
| 4,001,925 A | * | 1/1977 | Eriksson | 407/107 |
| 4,050,127 A | * | 9/1977 | Bodem et al. | 407/107 |

(Continued)

FOREIGN PATENT DOCUMENTS

FR    2626204 A1  *  7/1989  .......... B23B 27/16

*Primary Examiner*—Derris H. Banks
*Assistant Examiner*—Sara Addisu
(74) *Attorney, Agent, or Firm*—William E. Jackson; Stites & Harbison, PLLC

(57) ABSTRACT

The profile turning tool is used for rough-turning and dressing circumferential and flat surfaces, in particular of workpieces made of light metals. It consists of a holder (10) with a receiver (16) for a diamond cutting head (18) as well as a claw (20), which is embodied as a chip breaker, engages a longitudinal groove (26) in the holder (10) and braces the cutting head (18) by means of a tightening screw (22). The groove (26) is located directly behind the cutting head (18). In longitudinal section, its base has an arcuate, concave shape and represents a pivot bearing for the claw (20) that has a correspondingly shaped underside and is guided on the lateral walls of the groove (26). The tightening screw (22) extends in front of the center of the arc with play through a hole in the claw (20).

12 Claims, 4 Drawing Sheets

U.S. PATENT DOCUMENTS

Figure 1:
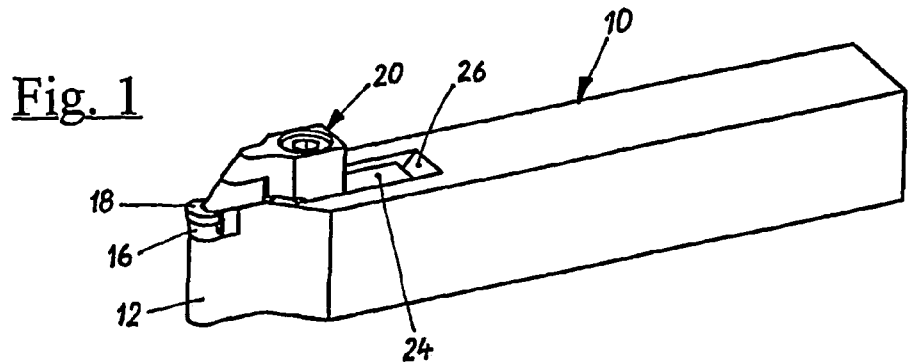

| | | | |
|---|---|---|---|
| 4,169,690 A * | 10/1979 | Kendra | 407/90 |
| 4,321,846 A * | 3/1982 | Neamtu | 82/158 |
| 4,334,807 A * | 6/1982 | Nessel | 407/103 |
| 4,533,283 A * | 8/1985 | Satran et al. | 407/111 |
| 4,552,491 A * | 11/1985 | Parker | 407/107 |
| 4,611,959 A * | 9/1986 | Kress et al. | 408/180 |
| 5,100,268 A * | 3/1992 | Nakayama et al. | 407/104 |
| 5,685,672 A * | 11/1997 | Tjernstrom | 407/104 |
| 5,772,366 A * | 6/1998 | Wiman et al. | 407/119 |
| 5,803,675 A * | 9/1998 | Von Haas | 407/107 |
| 6,004,079 A * | 12/1999 | Kislinger | 407/34 |
| 6,146,062 A * | 11/2000 | Jansson | 407/107 |
| 6,273,650 B1 * | 8/2001 | Jordberg | 407/102 |
| 6,409,435 B1 * | 6/2002 | Kocherovsky et al. | 407/104 |

* cited by examiner

PROFILE TURNING TOOL

The invention relates to a profile turning tool for rough-turning and dressing circumferential and flat surfaces, in particular of workpieces made of light metals, consisting of a rod-shaped holder with a receiver for a cutting element with a rounded cutting head, whose cutting edge is made of a material such as diamonds or cubical boron nitride and extends over a circumferential angle of more than 90°, and of a claw, engaging a longitudinal groove in the holder and having a front end in form of a chip breaker, which claw clamps the cutting element to the holder by means of a tightening screw being screwed into the holder.

Such a turning tool is described in DE 199 37 738 A1. It is used, inter alia, for processing the circumferential and end surfaces of light metal rims in a single work step. In the course of rough-turning to a chip depth of up to 5 mm and high cutting speeds, extreme stresses from directions changing over 180° act on the cutting head and the chip breaker. Under these stresses, hard metal tools are worn out after processing 200 rims, i.e. it is necessary to replace the tools twice per shift. Tools with a cutting insert of poly-crystalline diamond or boron nitride have a long service life, but up to now could not be stressed this high, because the clamped cutting insert started to oscillate and broke.

Although with the embodiment described in DE 199 37 738 A1, a positive connection by matching forms of the cutting insert and the chip breaker on all sides has been achieved, the structure is elaborate and voluminous, because the absorption of the transverse forces acting on the claw takes place at a tightening screw, which is laterally offset in respect to the cutting head, and at a further guide groove, which is even further laterally offset.

Therefore the object of the invention is based on improving the known turning tool in such a way that the clamping of the cutting element and the chip breaker is simpler, and simultaneously stronger and stiffer.

The above object is attained in accordance with the invention in that the center longitudinal axis of the cutting head extends in the longitudinal direction through the groove, whose base has a concave form in cross section and forms a pivot bearing for the claw, which is convexly shaped on its underside in the engagement area and is guided on the lateral walls of the groove, and that ahead of the center of the convexity the tightening screw extends with play through a hole in the claw.

The invention offers the advantage that the tightening screw and the lateral guide faces of the claw are located at a short distance directly behind the cutting head. The claw can be considerably narrower. It rests with a large surface against the holder, which prevents natural vibrations, but yet constitutes a pivotable lever for transmitting the tension force of the screw toward the front to the cutting head. The lever arms are short and have a considerably better relationship with each other than in the known embodiment. The cooperating rounded, preferably partially cylindrical, faces in the groove in the holder and on the claw have the dual function of forming a pivot bearing for the claw and moreover, to replace the axial detent for it, which heretofore had been separate.

In the preferred actual embodiment, the distance between the center axis of the hole and the center of the convexity, measured in the longitudinal direction of the holder, is greater than one third, preferably even greater than half the distance between the center axis of the hole and the center of the clamping point between the claw and the cutting element. Because of this, a considerably greater portion of the tension force of the screw than up to now can be applied as a clamping force on the cutting element. So that the chips being generated in the lateral cutting edge area do not run against a chip breaker which, although it falls off obliquely toward the tip, up to now at the side forms a substantially right angle with the top of the cutting head, the end of the claw, which preferably is made of hard metal, is provided on at least one lateral face with a chip-guiding depression.

In a further preferred embodiment of the invention the cutting element consists only of the cutting head in the shape of a cutting plate which is either circular or has a cutting edge at the front and sides in the shape of an arc of a circle, which extends over more than 180° and has a contact face at the rear end which, in a view from above, differs from the shape of the cutting edge in form of an arc of a circle, and by means of which it can be maintained fixed against relative rotation.

In actual use an embodiment of the turning tool in accordance with the invention is preferred wherein the cutting plate has a layer of a hard cutting material, such as poly-crystalline diamond or boron nitride, on a layer of hard metal, and wherein a centering pin is formed of the hard metal layer concentrically to the cutting edge in the shape of an arc of a circle, and which can be inserted into a matching receiving hole at the front end of the holder. At this point a transmission of the axial and transverse forces acting on the holder takes place already directly next to the cutting edge. In view of the stresses occurring here it is recommended that the receiver for the cutting plate be constituted by an insert of hard metal soldered to the front end of the holder, which is provided with the receiving hole and, if desired, with a support face acting together with the contact surface.

Figure 2:
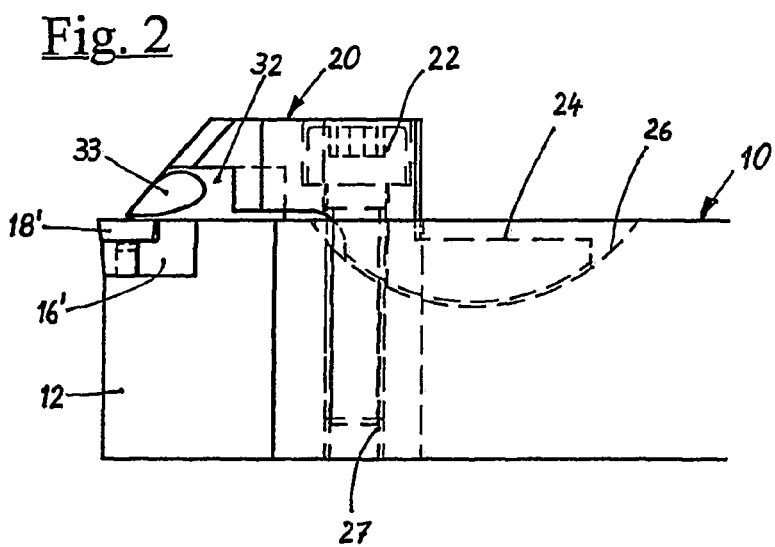
Figure 4:
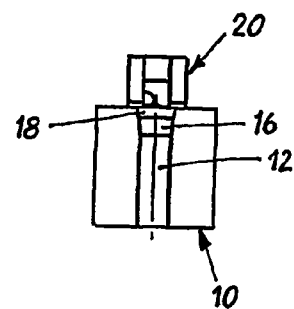
Figure 3:
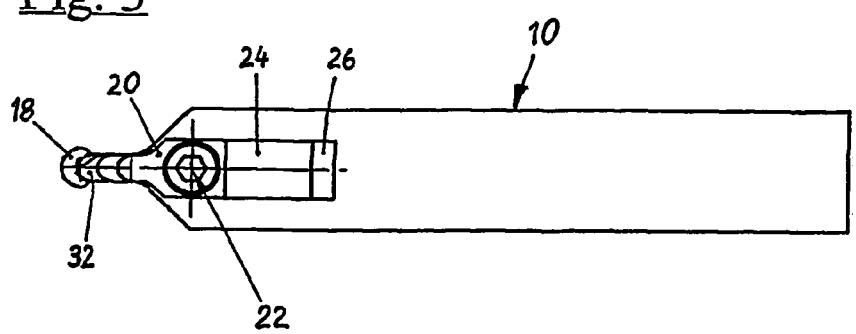
Figure 5:
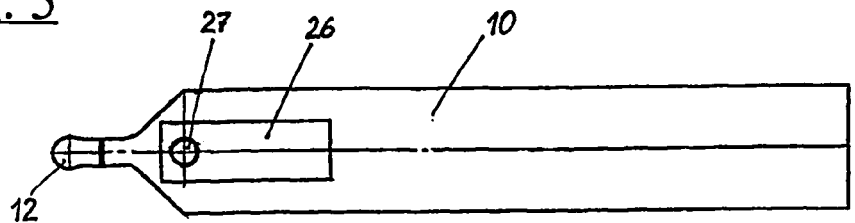
Figure 6:
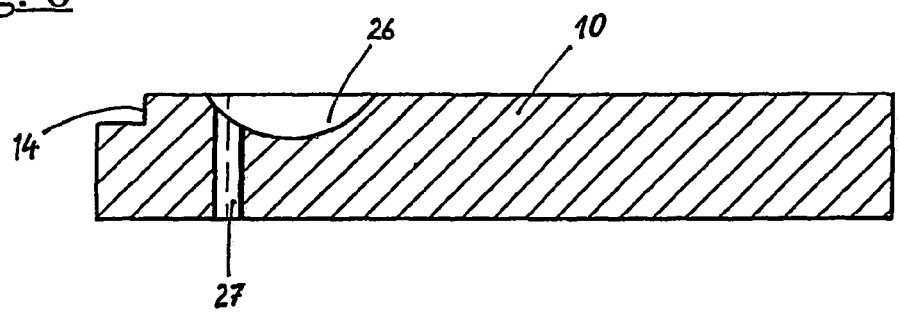
Figure 7:
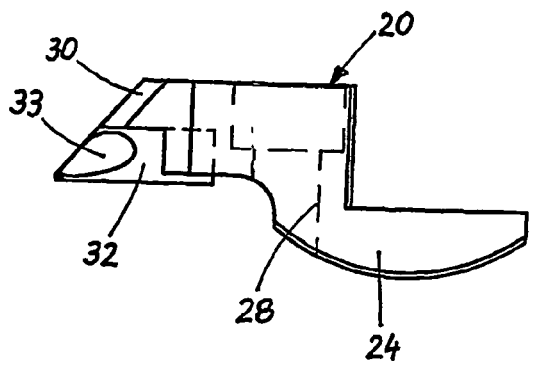
Figure 8:
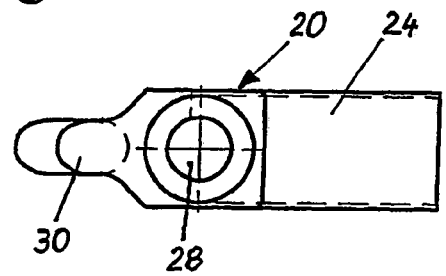
Figure 9:
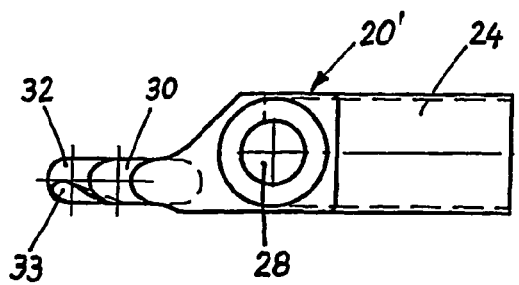
Figure 10:
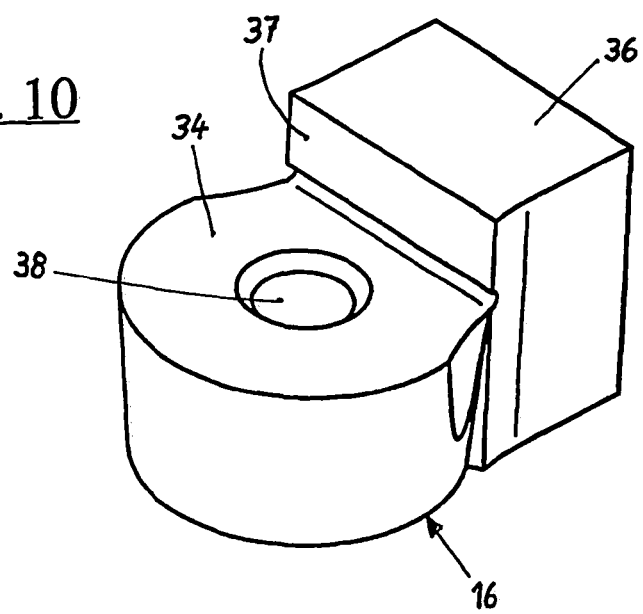
Figure 11:
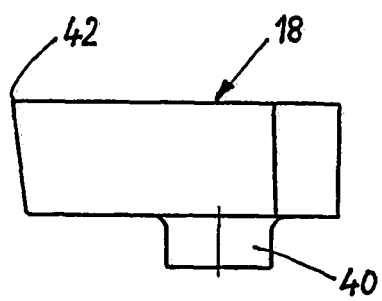
Figure 12:
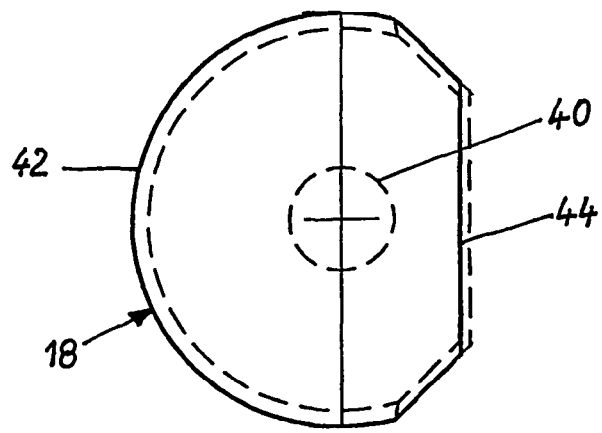
Figure 13:
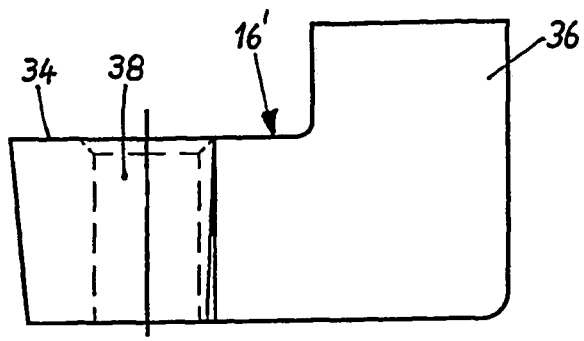
Figure 14:
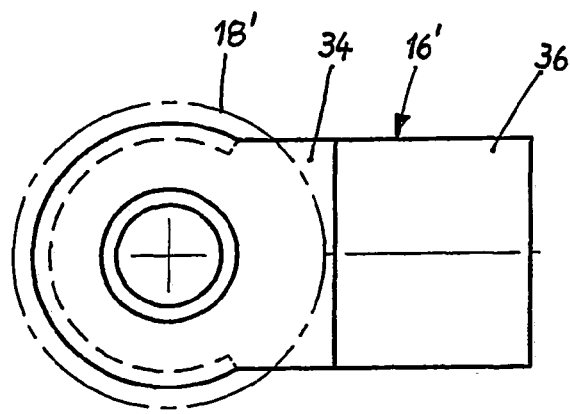
Figure 15:
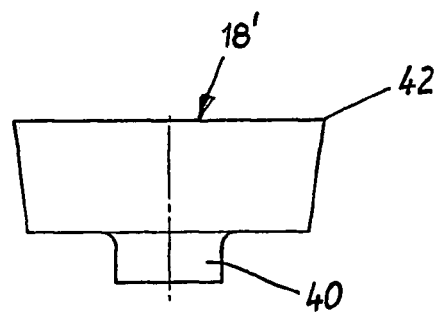
Figure 16:
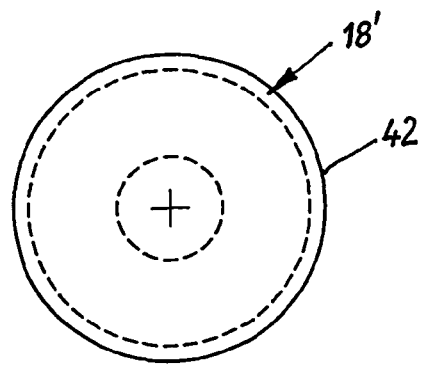

An exemplary embodiment of the invention will be explained in greater detail in what follows by means of the attached drawings. Shown are in:

FIG. 1, a perspective plan view of a turning tool in accordance with the invention, FIGS. 2 to 4, a lateral view of the front area on an enlarged scale, as well as a view from above and front view of turning tools in accordance with FIG. 1, FIGS. 5 and 6, a view from above and a longitudinal section of the holder of the turning tools in accordance with FIGS. 1 to 4, FIGS. 7 and 8, a lateral view and a view from above on a claw with, and without, a chip breaker insert of the turning tool in accordance with FIG. 2, FIG. 9, a view from above on an alternatively usable asymmetric claw with a chip breaker insert, FIG. 10, a perspective plan view of a hard metal insert to be soldered to the front end of the holder in accordance with FIGS. 5 and 6, FIGS. 11 and 12, a lateral view and a view from above on the cutting plate, pressed against and centered on the hard metal insert in accordance with FIGS. 7 to 9 by means of a claw in accordance with FIGS. 7 and 8, of the turning tool in accordance with FIG. 1, FIGS. 13 and 14, a lateral view and a view from above on a hard metal insert which can be employed alternatively to the embodiment of FIG. 10, and FIGS. 15 and 16, a lateral view and a view from above on a cutting plate used together with the hard metal insert in accordance with FIGS. 13 and 14.

The novel turning tools represented in FIGS. 1 to 4 each consist of an elongated holder 10 of rectangular cross section which tapers to a narrow tongue 12 at the front end. In the area of this tongue 12, the holder 10 is provided with a step-shaped cutout 14 in accordance with FIGS. 5 and 6, to which the hard metal insert 16, or 16', represented in FIG. 10 or in FIGS. 13 and 14, is soldered. A cutting plate 18 (FIGS. 11 and 12), or 18' (FIGS. 15 and 16) has been placed on the latter and is clampingly held by a claw 20, which itself is braced to the holder 10 by means of a tightening screw 22. As shown in FIGS. 1, 3 and 4, in the case of the example the shape and arrangement of the parts is symmetrical in respect to a vertical center longitudinal plane through the holder 10. With this arrangement, the claw 20 needs to be only a little wider than the head of the tightening screw 22, and in turn the holder 10 only sufficiently as wide as required for taking up the stresses acting on it. Alternatively, FIG. 9 shows an asymmetrical claw 20' in a view from above for use with a holder 10 with a tongue 12 asymmetrically arranged in a corresponding manner.

A specialty of the represented turning tool lies in that, with its part 24 extending to the rear from the tightening screw 22, the claw 20 is seated in a groove 26 in the holder 10 which, in accordance with FIG. 6, in longitudinal section has a bottom in the shape of an arc of a circle. The threaded bore, identified by 27, for the tightening screw 22 is located at the front end of the groove 26. The width of the rear portion 24 of the claw 20 matches the width of the groove 26, so that the latter offers a lateral guidance for the claw 20. The groove 26 and the rear portion 24 of the claw 20 preferably have a rectangular cross section. However, the touching lateral faces of the groove 26 and the claw 20 could also be inclined in such a way that they diverge from the bottom of the groove toward the top.

The partially cylindrical concave shape of the base of the groove 26, together with the partially cylindrical shape of the lower face of the rear portion 24 of the claw 20 of a matching radius result in a pivot bearing for the latter. In the course of tightening the tightening screw 22, it can be rotated around the center of the partially cylindrical faces. In order not to interfere with the pivotability, the tightening screw 22 is seated with radial play in a stepped through-bore 28 receiving it in the claw 20. In the assembled state in accordance with FIG. 1 and FIG. 2, the partially cylindrical base of the groove 26 forms an axial detent for receiving the axial forces acting on the claw 20. The transverse forces are absorbed by the lateral faces of the groove 26.

In order to keep the dimensions and the volume in the front area of the turning tool as small as possible, shortly back of the bore 26 the claw 20 is stepped to such an extent that, in the assembled state in accordance with FIG. 1, the rearmost area approximately terminates with the top edge of the groove 26, or is slightly lower, so that the rearmost area of the claw 20 is completely received in the groove 26, as shown in FIG. 1.

In front of the bore 28, the claw 20, or 20', tapers into a centered tongue 30 or into an asymmetrically arranged tongue 30', each corresponding in width to the front end of the holder 10. At the foremost end it descends obliquely from top to bottom. The foremost end of the tongue 30, or 30', is constituted by a hard metal insert 32, which is soldered on the remaining portion of the claw 30, or 30', and acts as a chip breaker during the turning operation. The inclination of the front edge of the hard metal insert in its longitudinal center plane can be approximately 35°, for example. The lower end of the hard metal insert 32 slightly protrudes in respect to the lower surface of the front area of the main body of the claw 20, or 20', in accordance with FIG. 7 on the lower side of the claw 20, or 20', so that in the mounted state in accordance with FIG. 2 the tension force applied by the tightening screw 22 at the front end of the claw 20, or 20', only acts in the form of a clamping force on the cutting plate 18, or 18', via the lower face of the hard metal insert 32.

Alternatively, the hard metal insert 32 can also have the shape of a round rod, extending over the entire height of the front end of the claw 20, or 20', and constituting its front end.

Because of the great stress, not only does the foremost end of the claw 20, or 20', consist of a hard metal element 32, but also the foremost portion 16, or 16', of the holder 10 holding the cutting plate 18, or 18'. In accordance with FIG. 10, the hard metal insert 16 soldered to the remaining portion of the holder 10 has a largely rounded front portion 34, and a rear, higher, cuboid portion 36. The front portion 34 is slightly less in diameter than the cutting plate 18 in accordance with FIGS. 11 and 12, whose front area is also circular over more than 180°. The circumferential wall of the circular front area 34 of the hard metal insert 16 forms a truncated cone tapering from the top to the bottom at an inclination of 5°, for example, which, however, makes a transition behind the center with a transition radius into the cuboid rear portion 36 of the hard metal insert 16.

The rounded front portion 34 of the hard metal insert 16 is provided with a countersunk through-bore 38, which forms a centering bore for receiving a centering pin 40, formed on the underside of the cutting plate 18. The cuboid rear portion 36 of the hard metal insert 16 protrudes by the thickness of the cutting plate 18, measured without the centering pin 40, upward past the front portion 34, so that a flat perpendicular support face 37 is formed. However, for reasons of practicality, in the assembled state in accordance with FIG. 1 the upper surface of the rear portion 36 of the hard metal insert 16 should lie on a slightly lower level than the upper surface of the cutting plate 18 in order to assure that the claw 20 only puts pressure on the cutting plate 18.

The cutting plate 18 consists of an upper layer of polycrystalline diamond, boron nitride or another hard material which in the production process was connected in one piece to a lower layer of hard metal. The hard metal of the lower layer has then been worked down to such an extent that the centering pin 40 was created. The circumferential wall, round at the front and the sides, of a diameter of approximately 8 mm, for example, tapers from the top to the bottom to form a slightly conical truncated cone surface forming an angle, for example of approximately 8°, with the center longitudinal axis of the centering pin 40. In this way a cutting edge 42 results on the upper circumferential edge extending over more than 180°. Approximately 1 mm back of the center, the circle of an arc then makes a transition on both sides into inclined faces extending, for example, at 45° inclined in relation to the perpendicular center longitudinal plane. Approximately 2.25 mm back of the center, the cutting plate 18 terminates at a transversely extending perpendicular contact face 44 which, together with the front support face 37 of the rear portion 36 of the hard metal insert 16 projecting past the front portion 34, on which it comes to rest, prevents a rotation of the cutting plate 18. Furthermore, via the rear contact face 44 that part of the axial force is supported which is not transmitted by the only approximately 1 mm high centering pin 40 and the friction between the cutting plate 18 and the hard metal insert 16.

It is understood that for an adaptation to special applications the portions of the above described turning tool can have a different shape, or can consist of materials other than those mentioned. For example, it can easily be seen that in individual cases a considerably larger cutting plate, for example made of a ceramic material, can take the place of the comparatively small cutting plate 18 in the exemplary embodiment, wherein the cross section of the front end 12 of the holder 10 and of an insert 16 possibly applied there, as well as the front end of the claw, would have to be matched to the shape of the cutting plate 18.

A hard metal insert 16', corresponding to the hard metal insert 16, is represented as a further alternative in FIGS. 13 and 14, wherein the distance of the through-bore 38 from the cuboid rear portion 36 is so large that a cutting plate 18', indicated in FIG. 14 and represented in a lateral view and in a view from above in FIGS. 15 and 16, having a cutting edge 42 extending over the entire circumference, can be placed on the front portion 34. A turning tool provided with such a cutting plate is shown in FIG. 2, and in addition as a further preferred embodiment, a depression 33, called a chip guidance step, in a front lateral face of the hard metal insert 22 of the claw 20, or 20', acting as a chip breaker. Depending on the forward feed direction during turning, the depression can be provided on the left side, as indicated in FIGS. 7 and 9, or on the right side, as indicated in FIGS. 3 and 4, of the chip breaker insert 32. It sees to it that chips formed in the lateral area of the cutting edge 42 do not run up on a lateral wall of the chip breaker insert 32, which otherwise extends comparatively steeply or perpendicularly on the chip face of the cutting plate 18, or 18'.

What is claimed is:

1. A profiled turning tool for rough-turning and dressing circumferential and flat surfaces on workpieces made of light metals, comprising of a rod-shaped holder (10) with a receiver (16) for a cutting element (18) with a rounded cutting head, whose cutting edge (42) is made of diamonds or cubical boron nitride and extends over a circumferential angle of more than 90°, and of a claw (20), engaging a longitudinal groove (26) in the holder (10) and having a front end (32) in form of a chip breaker, which claw clamps the cutting element (18) to the holder (10) by means of a tightening screw (22) being screwed into the holder (10), characterized in that the center longitudinal axis of the cutting head (18) extends in the longitudinal direction through the groove (26), whose base has a concave form in cross section and forms a pivot bearing for the claw (20), which is convexly shaped on its underside in the engagement area and is guided on the lateral walls of the groove (26), and that ahead of the center of the convexity, the tightening screw (22) extends with play through a hole (28) in the claw (20).

2. The turning tool in accordance with claim 1, characterized in that the concave base of the groove (26) and the convexly arched surface on the underside of the claw (20) rotatably guided on it are partially cylindrical faces of matching radii.

3. The turning tool in accordance with claim 1, characterized in that the axis of rotation of the claw (20) forms a right angle with the lateral walls of the groove (26).

4. The turning tool in accordance claim 1, characterized in that the distance between the center axis of the hole (28) and the center of the convex arching, measured in the longitudinal direction of the holder (10), is greater than one third the distance between the center axis of the hole (28) and the center of the clamping point between the claw (20) and the cutting element (18).

5. The turning tool in accordance with claim 4, characterized in that said distance is preferably greater than half.

6. The turning tool in accordance with claim 1, characterized in that for at least a distance from the hole (28) on said claw (20), the height of the claw (20) behind the hole (28) is at most as large as the depth of the groove (26) receiving it at the same location.

7. The turning tool in accordance with claim 1, characterized in that the front end (32) of the claw (20), which can be pressed against the cutting element (18), is made of hard metal and has the shape of a chip breaker.

8. The turning tool in accordance with claim 7, characterized in that the front end (32), made of hard metal, of the claw (20) is provided on at least one lateral face with a chip guidance depression (33).

9. The turning tool in accordance with claim 1, characterized in that the cutting element (18, 18') comprises of the cutting head in the form of a cutting plate which is circular, or has at the front and the sides a cutting face (42) in the shape of an arc of a circle and extending over more than 180°, and at the rear has a contact face (44) which, in a view from above, differs from the shape in the arc of a circle of the cutting edge (42).

10. The turning tool in accordance with claim 9, characterized in that the cutting plate (18, 18') has a layer of a hard cutting material of a poly-crystalline diamond or cubical boron nitride, on a layer of hard metal, and that a centering pin (40) is shaped concentrically in relation to the cutting edge (42) in the form of an arc of a circle from the layer of hard metal, which can be inserted into a matching receiving hole (38) at the front end (12, 16) of the holder (10).

11. The turning tool in accordance with claim 10, characterized in that the receiver for the cutting plate (18, 18') is formed by an insert (16, 16') of hard metal soldered to the front end (12, 14) of the holder (10) and is provided with the receiving hole (38).

12. The turning tool in accordance with claim 11, characterized in that the insert (16) on the holder (10) is provided with a support face (37) acting together with the contact face (44).

* * * * *